(12) United States Patent
Song et al.

(10) Patent No.: US 12,255,018 B2
(45) Date of Patent: Mar. 18, 2025

(54) NICKEL FOIL FOR PRODUCTION OF THIN-FILM CAPACITOR, AND MANUFACTURING METHOD FOR SAME

(71) Applicant: ILJIN MATERIALS CO., LTD., Iksan-si (KR)

(72) Inventors: Ki Deok Song, Iksan-si (KR); Chang Yol Yang, Iksan-si (KR); Sang Hwa Yoon, Iksan-si (KR)

(73) Assignee: LOTTE ENERGY MATERIALS CORPORATION, Jeollabuk-Do (KR)

( * ) Notice: Subject to any disclaimer, the term of this patent is extended or adjusted under 35 U.S.C. 154(b) by 127 days.

(21) Appl. No.: 17/753,873

(22) PCT Filed: Dec. 17, 2019

(86) PCT No.: PCT/KR2019/017919
§ 371 (c)(1),
(2) Date: Mar. 16, 2022

(87) PCT Pub. No.: WO2021/080085
PCT Pub. Date: Apr. 29, 2021

(65) Prior Publication Data
US 2022/0367114 A1    Nov. 17, 2022

(30) Foreign Application Priority Data

Oct. 24, 2019 (KR) .................. 10-2019-0132806

(51) Int. Cl.
*H01G 4/008* (2006.01)
*H01G 4/33* (2006.01)

(52) U.S. Cl.
CPC .............. *H01G 4/008* (2013.01); *H01G 4/33* (2013.01)

(58) Field of Classification Search
CPC ................................. H01G 4/33; H01G 4/008
See application file for complete search history.

(56) References Cited

U.S. PATENT DOCUMENTS

| | | | |
|---|---|---|---|
| 2004/0163842 A1 | 8/2004 | Okada et al. | |
| 2006/0079050 A1* | 4/2006 | Cahalen | H01G 4/005 438/250 |

(Continued)

FOREIGN PATENT DOCUMENTS

| | | |
|---|---|---|
| CN | 1533686 A | 9/2004 |
| CN | 1783373 A | 6/2006 |

(Continued)

OTHER PUBLICATIONS

International Search Report of PCT/KR2019/017919, Jul. 23, 2020, 4 pages.

(Continued)

*Primary Examiner* — David M Sinclair
(74) *Attorney, Agent, or Firm* — Womble Bond Dickinson (US) LLP (57) ABSTRACT

Provided is an electrolytic nickel foil including, on at least one surface thereof, a flat surface having the following surface roughness: a Ra of 0.05 μm or less, a Rz of 0.2 μm or less, and a Rt of 0.5 μm or less and a glossiness of 200 GU or more as determined by measuring a 60° specular reflection angle.

6 Claims, 7 Drawing Sheets
(6 of 7 Drawing Sheet(s) Filed in Color)

(56) References Cited

U.S. PATENT DOCUMENTS

| | | | |
|---|---|---|---|
| 2006/0283715 A1* | 12/2006 | Diaddario, Jr. | ........ C25D 3/565 205/245 |
| 2007/0071999 A1 | 3/2007 | Ito et al. | |
| 2010/0038115 A1 | 2/2010 | Matsuda et al. | |
| 2012/0219825 A1 | 8/2012 | Minagi et al. | |
| 2013/0224514 A1* | 8/2013 | Sugiyama | ................ B32B 7/12 428/626 |
| 2015/0299891 A1 | 10/2015 | Buckalew | |
| 2017/0025324 A1 | 1/2017 | Yamaki et al. | |
| 2018/0228029 A1* | 8/2018 | Moriyama | ............. C25D 5/605 |

FOREIGN PATENT DOCUMENTS

| | | | |
|---|---|---|---|
| CN | 101122036 A | | 2/2008 |
| CN | 102320559 A | * | 1/2012 |
| CN | 104204284 A | | 12/2014 |
| CN | 107829115 A | | 3/2018 |
| EP | 1 646 072 A2 | | 4/2006 |
| EP | 1 876 266 A1 | | 1/2008 |
| GB | 2 085 924 A | | 5/1982 |
| JP | H6-346271 A | | 12/1994 |
| JP | 07278845 A | * | 10/1995 |
| JP | 1996-319540 A | | 12/1996 |
| JP | 1999-220233 A | | 8/1999 |
| JP | 2000-219996 A | | 8/2000 |
| JP | 2004-87772 A | | 3/2004 |
| JP | 2006-49653 A | | 2/2006 |
| JP | 2006-54320 A | | 2/2006 |
| JP | 2006-140454 A | | 6/2006 |
| JP | 2006-165400 A | | 6/2006 |
| JP | 2006-281575 A | | 10/2006 |
| JP | 2008-50673 A | | 3/2008 |
| JP | 2008-536292 A | | 9/2008 |
| JP | 2008-239420 A | | 10/2008 |
| JP | 2011168818 A | * | 9/2011 |
| JP | 2013-174671 A | | 9/2013 |
| JP | 2014-91845 A | | 5/2014 |
| JP | 2017-199706 A | | 11/2017 |
| KR | 10-2006-0052135 A | | 5/2006 |
| KR | 10-2007-0112458 A | | 11/2007 |
| KR | 10-2012-0007064 A | | 1/2012 |
| KR | 10-2019-0073733 A | | 6/2019 |
| WO | 2006/118237 A1 | | 11/2006 |
| WO | WO-2009057688 A1 | * | 5/2009 ............... C22C 9/00 |

OTHER PUBLICATIONS

Supplementary European Search Report for EP 19 95 0163, dated Dec. 8, 2022, 8pp.

Office Action issued on Mar. 14, 2023 in the corresponding Japanese Patent Application No. 2022-521004, 4pp.

Office action issued in corresponding Chinese Application No. 201980101536.3, dated May 17, 2024, 10pp.

Renner, R.F. et al.; "Effect of thiourea and saccharin on the roughness of electrodeposited ultrathin nickel and cobalt layers"; Journal of Applied Electrochemistry; 32; pp. 621-627; 2002.

Zhao, Yang et al.; "Optimization of Technology for Electrodeposition of Nickel Coating on Q235A Steel Substrate"; Journal of Materials Protection; 47; 9; 397; CNKO; Sep. 15, 2014; 6pp.

* cited by examiner

Ra: 0.4777 um  Rq: 0.6066 um  Rt: 3.6633 um  Rp: 1.8305 um  Rv: 1.8329 um  Rz: 3.6474 um
[ S Parameters ]
Sa: 0.4777 um  Sq: 0.6066 um  St: 3.6633 um  Sp: 1.8305 um  Sv: 1.8329 um  Sz: 3.6474 um
PC: 326.67 Pc  S: 1.1755 nm  Sm: 2.9910 nm  SDR: 175.16 Percent

NICKEL FOIL FOR PRODUCTION OF THIN-FILM CAPACITOR, AND MANUFACTURING METHOD FOR SAME

CROSS-REFERENCE TO RELATED APPLICATIONS

The present application is a U.S. National Phase Patent Application of International Application Number PCT/KR2019/017919, filed on Dec. 17, 2019, which claims priority to Korean Patent Application Number 10-2019-0132806, filed Oct. 24, 2019, the entire content of each of which is incorporated herein by reference.

TECHNICAL FIELD

The present invention relates to an electrolytic nickel foil, and particularly, to an electrolytic nickel foil, which has low roughness and high glossiness and is capable of manufacturing a thin film-type capacitor without a chemical-mechanical polishing (CMP) process, a preparation method thereof, and a thin film-type capacitor manufactured therefrom.

BACKGROUND ART

Semiconductor devices including integrated circuits are required to be able to transmit high-frequency and high-speed signals and be operated at a low voltage. In order to stably supply power and minimize noise generation at the same time, low impedance of the system is first required. Therefore, thin film-type ceramic thin film capacitors having high static capacitance density are used for the printed circuit board package.

The thin film-type ceramic thin film capacitor is manufactured by depositing a dielectric on a metal foil such as nickel, firing the same, and then depositing a metal on the dielectric. In the case of the capacitor with such a structure, the flatness of the metal foil needs to be high to prevent a short circuit from occurring, but the conventionally used metal foil has low surface flatness and therefore is not suitable for use as it is.

Chemical-mechanical polishing (CMP) is the most widely adopted method for lowering the roughness of a metal foil for manufacturing a thin film-type capacitor. As disclosed in Korean Patent Application Publication No. 10-2012-0007064, CMP is effective in reducing roughness, but it has disadvantages in that process costs are high and much time is consumed.

In order to obtain a metal thin film having low surface roughness for improving the efficiency of a process and the stability of the manufactured capacitor, various studies have been conducted. For example, Korean Patent Application No. 10-2019-0073733 discloses a method of preparing an iron-nickel alloy foil having excellent surface roughness. However, according to this invention, average surface roughness (Ra) is only lowered to about 0.1 μm, which is still not sufficient to manufacture a thin film-type ceramic thin film capacitor.

DISCLOSURE

Technical Problem

The present invention is directed to providing an electrolytic nickel foil capable of manufacturing a thin film-type capacitor with a separate chemical-mechanical polishing (CMP) process due to having low and uniform roughness and high glossiness.

The present invention is also directed to providing a thin film-type capacitor manufactured from the electrolytic nickel foil.

The present invention is also directed to providing a method of preparing the electrolytic nickel foil without a separate CMP process due to low roughness and high glossiness.

The above and other objects of the present invention can all be achieved by the present invention described below.

Technical Solution

1. One aspect of the present invention provides an electrolytic nickel foil. The electrolytic nickel foil is achieved by an electrolytic nickel foil including, on at least one surface thereof, a flat surface having an arithmetic average surface roughness (Ra) of about 0.05 m or less, a ten-point average surface roughness (Rz) of about 0.20 μm or less, a maximum surface protrusion height (Rt) of about 0.50 μm or less, and a 60° specular gloss of about 200 GU or more.

2. In the first embodiment, the electrolytic nickel foil may have a Ra of about 0.03 μm or less, a Rz of about 0.15 μm or less, a Rt of about 0.30 μm or less, and a 60° specular gloss of about 400 GU or more.

3. In the first or second embodiment, the electrolytic nickel foil may have a total thickness of about 1 to 100 μm.

4. Another aspect of the present invention provides a method of preparing the electrolytic nickel foil. The preparation method includes performing electrolytic plating with an electrolyte including about 400 to 600 g/L of a nickel ion precursor, about 10 to 30 g/L of a pH buffer, and about 0.5 to 2.0 g/L of a roughness controlling agent and having a pH of about 1 to 5.

5. In the fourth embodiment, the nickel ion precursor may be one or more selected from the group consisting of nickel sulfate, nickel sulfamate, nickel chloride, and nickel nitrate.

6. In the fourth or fifth embodiment, the pH buffer may be selected from among boric acid and sodium citrate.

7. In the fourth to sixth embodiments, the roughness controlling agent may be two or more selected from the group consisting of saccharin, carboxyethyl isothiouronium chloride, sodium allyl sulfonate, butynediol propoxylate, butynediol ethoxylate, propargyl alcohol propoxylate, pyridinium propyl sulfobetaine, and propanesulfonic acid sodium salt.

8. In the fourth to seventh embodiments, the electrolytic plating may be performed by applying current at a current density of about 10 to 100 A/dm$^2$ at a plating solution temperature of about 40° C. to 60° C.

9. Still another aspect of the present invention provides a thin film-type capacitor including the above-described electrolytic nickel foil, a dielectric formed on the electrolytic nickel foil, and a conductive metal layer formed on the dielectric.

Advantageous Effects

The present invention can provide an electrolytic nickel foil, a method of preparing the electrolytic nickel foil, and a capacitor including the electrolytic nickel foil, and the electrolytic nickel foil exhibits high smoothness due to having a low arithmetic average surface roughness (Ra), a low ten-point average surface roughness (Rz), a low maximum surface protrusion height (Rt), and a high 60° specular gloss even when not polished. Accordingly, even when a dielectric is applied with a low thickness thereon, the electrolytic nickel foil has a low risk of short circuit occurring by protrusions formed on the electrolytic nickel foil passing through the dielectric layer and thus being in contact with a conductive metal layer.

The present invention can also provide an electrolytic nickel foil which can be used to manufacture a thin film-type capacitor without a separate polishing process such as a CMP process due to having low roughness and high glossiness, and a method of preparing the electrolytic nickel foil which has excellent process efficiency.

DESCRIPTION OF DRAWINGS

The patent or application file contains at least one drawing executed in color. Copies of this patent or patent application publication with color drawing(s) will be provided by the Office upon request and payment of the necessary fee.

MODES OF THE INVENTION

Hereinafter, embodiments of the present invention will be described in detail with reference to the accompanying drawings. However, in describing exemplary embodiments of the present invention in detail, when it is determined that a detailed description of a related technology or configuration may unnecessarily obscure the gist of the present invention, the detailed description thereof will be omitted.

The terms used in the specification are defined in consideration of functions used in the present invention and can be changed according to the intent or custom of clients, operators, and users. Accordingly, definitions of the terms should be understood on the basis of the entire description of the present invention.

As used herein, Ra, Rz, and Rt are parameters indicating the roughness of an electrolytic nickel foil and are measured in accordance with the ISO 25178 standard.

Ra means arithmetic average roughness, Rz means ten-point average roughness, and Rt means maximum protrusion height.

The glossiness of an electrolytic nickel foil means a 60° specular gloss and is a value measured in accordance with the JIS Z 8741 standard. The unit thereof is gloss units (GU).

The following embodiments are merely examples of means for implementing the present invention, the present invention is not limited to the following embodiments, and the following embodiments need to be modified and changed depending on the configuration and conditions to which the present invention is applied.

Preparation of Electrolytic Nickel Foil

An electrolytic nickel foil may be prepared by performing electrolytic plating with an electrolyte including a nickel ion precursor, a pH buffer, and a roughness controlling agent and having a pH concentration of 1 to 5.

The electrolyte includes the nickel ion precursor in an amount of about 400 to 600 g/L with respect to the total volume of the electrolyte, and within the above-described range, the surface roughness and glossiness of the electrolytic nickel foil are excellent. The nickel ion precursor may be used without limitation as long as it is a precursor used in nickel ion plating, and is preferably selected from the group consisting of nickel sulfate, nickel sulfamate, nickel chloride, and nickel nitrate. More preferably, nickel sulfate or nickel sulfamate is used.

The roughness controlling agent may include one or more compounds selected from among saccharin, carboxyethyl isothiouronium chloride, sodium allyl sulfonate, butynediol propoxylate, butynediol ethoxylate, propargyl alcohol propoxylate, pyridinium propyl sulfobetaine, and propanesulfonic acid sodium salt. Preferably, a combination of saccharin and sodium allyl sulfonate is used.

The roughness controlling agent may be used at a concentration of about 0.01 g/L to 2 g/L, and preferably, about 0.85 to 1.8 g/L in the electrolyte. In an embodiment, when saccharin and sodium allyl sulfonate are applied, each may be used at a concentration of about 0.05 g/L to 1.0 g/L.

In an embodiment, a concentration ratio of saccharin and sodium allyl sulfonate may be about 1:0.01 to 100, and preferably, about 1:0.05 to 1:20.

The electrolyte may include a pH buffer to adjust a pH concentration. The pH buffer may be used without limitation as long as it controls the pH concentration of the electrolyte to an appropriate level, and may be included in an amount of about 10 to 30 g/L with respect to the total volume of the electrolyte. Within the above-described range, process efficiency is excellent. Meanwhile, any type of the pH buffer may be used according to the purpose of the present invention as long as it does not cause an unnecessary chemical reaction, and for example, boric acid or sodium citrate may be used. When the pH buffer is applied, process stability may be enhanced, and an electrolytic nickel foil having excellent roughness may be prepared.

The pH buffer may be included in an amount of about 15 to 50 g/L in the electrolyte. Within the above-described range, a pH concentration and a process are easily controlled.

The pH concentration of the electrolyte ranges from about 1 to 5, and preferably, about 2 to 4. Within the above-described range, the surface roughness of the electrolytic nickel foil is excellent.

The electrolytic plating may be performed by a conventional method and is performed, for example, by inputting a base or mandrel into an electrolyte, performing electrolytic plating, and then removing the base or mandrel.

In an embodiment, the electrolytic plating may be performed by applying current at a current density of about 10 $A/dm^2$ to 100 $A/dm^2$, for example, about 15 $A/dm^2$ to 80 $A/dm^2$, to the electrolyte. Within the above-described range, the preparation of an electrolytic nickel foil having excellent surface roughness by an efficient process is possible.

In an embodiment, the electrolytic plating may be performed at about 40° C. to 60° C. Preferably, the electrolytic plating is performed at about 55° C. or more to less than 60° C. Under the above-described condition, an electrolytic nickel foil whose roughness and physical properties are excellent is formed.

The current application time may be appropriately adjusted according to the amount of an electrolytic nickel foil. In an embodiment, the application may be performed for about 300 to 500 seconds, and preferably, about 350 to 450 seconds. Within the above-described range, a thin electrolytic nickel foil whose process is efficient and whose roughness and glossiness are excellent can be prepared.

The prepared electrolytic nickel foil may have a thickness of about 1 μm to 100 μm, and preferably, about 3 μm to 75 μm. Within the above-described range, the electrolytic nickel foil is excellent in durability and versatility and suitable for use in a product such as a thin film-type capacitor or the like.

A flat surface having excellent roughness is provided on at least one surface of the electrolytic nickel foil of the present invention.

The flat surface of the electrolytic nickel foil may have the following roughness parameters: Ra=about 1.2 μm or less, Rz=about 1.0 μm or less, and Rt=about 1.5 μm or less, as measured through white-light scanning interferometry (WSI) and phase-shift interferometry (PSI).

In an embodiment, the flat surface may have the following surface roughness parameters: arithmetic average roughness (Ra)=about 0.5 or less, ten-point average roughness (Rz)=about 0.2 μm or less, and maximum protrusion height (Rt)=about 0.5 μm or less.

In another embodiment, the flat surface may have the following surface roughness parameters: a Ra of about 0.03 μm or less, a Rz of about 0.15 μm or less, and a Rt of about 0.3 μm or less.

In still another embodiment, the flat surface may have the following surface roughness parameters: a Ra of about 0.01 μm to 0.03 μm, a Rz of about 0.05 μm to 0.15 μm, and a Rt of about 0.1 μm to 0.2 μm.

Within the above-described roughness range, the flat surface has excellent roughness without a separate polishing process, and thus surface defects are reduced.

When the roughness parameters exceed the above-described ranges, the performance of a dielectric layer in a capacitor is adversely affected, resulting in insulation resistance and current leakage. Within the above-described surface roughness range, it is possible to provide an excellent electrolytic nickel foil that is not only flat throughout but also does not have a particularly protruding portion.

In addition, the flat surface may have a 60° specular gloss of about 50 GU to 800 GU, for example, about 200 GU to 700 GU. When the optical properties of the flat surface satisfy the above-described range, a uniform surface and excellent flatness are achieved.

Thin Film-Type Ceramic Thin Film Capacitor

Figure 4:
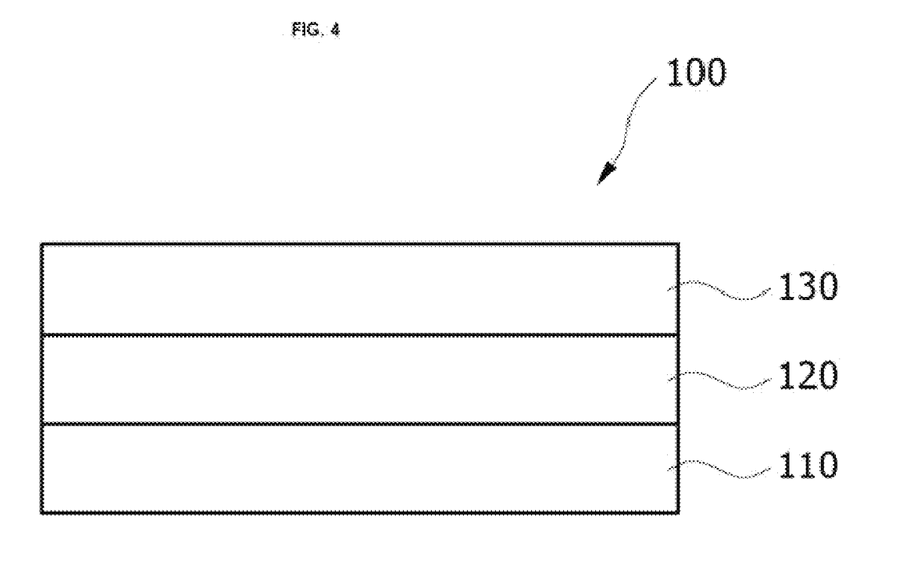
FIG. 4 shows a conceptual diagram illustrating the cross-sectional structure of a thin film-type capacitor.

A thin film-type ceramic thin film capacitor 100 including the electrolytic nickel foil of the present invention has a structure in which a nickel thin film layer 110, a dielectric layer 120, and a conductive metal layer 130 are sequentially stacked as shown in FIG. 4.

After the formation of the electrolytic nickel foil, the electrolytic nickel foil is entirely coated by forming dielectric grains on the surface of the electrolytic nickel foil without a separate polishing process. In this case, as a method of forming a thin film dielectric, sputtering, laser grinding, chemical vapor deposition, and chemical solution deposition methods may be used, and a sputtering method is preferred to enhance the denseness of a dielectric.

Those skilled in the art will be able to easily manufacture a capacitor from the electrolytic nickel foil by a sputtering method or the like. For example, the electrolytic nickel foil may be placed on a deposition plate, the deposition plate may be heated to about 500 to 800° C., and then a dielectric may be formed on the electrolytic nickel foil by sputtering.

After the deposition of the dielectric to a predetermined thickness, the dielectric may be fired to enhance the crystallinity and denseness of the dielectric layer.

For the deposition of an electrode, the electrolytic nickel foil having the dielectric formed thereon may be cooled, and then an electrode may be deposited on the surface thereof by a sputtering method, thereby completing a thin film capacitor. As the electrode, a gold or copper electrode is typically used, and any electrode may be used without limitation as long as it is a material that enables electrical connection.

Hereinafter, the configuration and operation of the present invention will be described in more detail through exemplary embodiments of the present invention. However, these are merely presented to exemplify the present invention, and the scope of the present invention should not be interpreted as being limited by the exemplary embodiments.

Content not described here will be omitted because it can be technically inferred sufficiently by those skilled in the art.

Example 1

An electrolyte including about 450 g/L of nickel sulfate as a nickel ion precursor, about 25 g/L of boric acid as a pH buffer, and about 0.1 g/L of saccharin and about 0.8 g/L of sodium allyl sulfonate as roughness controlling agents and having a pH of about 3 was used, and current was applied at a current density of about 20 A/dm$^2$ at an electrolyte temperature of about 55° C. for about 400 seconds to prepare an approximate 27 μm-thick nickel foil.

The surface of the prepared electrolytic nickel foil in an unpolished state had an arithmetic average roughness (Ra) of about 0.05 μm, a ten-point average roughness (Rz) of about 0.19 μm, a maximum protrusion height (Rt) of about 0.37 μm, and a 60° specular gloss of about 445 GU.

Examples 2 to 10

Electrolytic nickel foils were prepared in the same manner as in Example 1, except that conditions of an electrolyte and electrolysis as shown in the following Table 1 were applied.

TABLE 1

| Examples | Temperature (° C.) | Current density (A/dm$^2$) | Nickel precursor (type, g/L) | pH buffer (type, g/L) | Plating time (s) | pH | (C1) (g/L) | (C2) (g/L) |
|---|---|---|---|---|---|---|---|---|
| 1 | 55 | 20 | (A1), 450 | (B1), 25 | 400 | 3 | 0.1 | 0.8 |
| 2 | | | (A2), 450 | (B1), 25 | | | 0.1 | 0.8 |
| 3 | | | (A1), 450 | (B1), 25 | | | 0.3 | 0.8 |
| 4 | | | (A2), 450 | (B1), 25 | | | 0.3 | 0.8 |
| 5 | | | (A1), 450 | (B1), 25 | | | 0.8 | 0.8 |
| 6 | | | (A2), 450 | (B1), 25 | | | 0.8 | 0.8 |
| 7 | | | (A1), 450 | (B1), 25 | | | 1 | 0.6 |
| 8 | | | (A2), 450 | (B1), 25 | | | 1 | 0.6 |
| 9 | | | (A1), 450 | (B1). 25 | | | 1 | 0.4 |
| 10 | | | (A2), 450 | (B1), 25 | | | 1 | 0.4 |

A1: nickel sulfate A2: nickel sulfamate B1: boric acid B2: sodium citrate C1: saccharin C2: sodium allyl sulfonate Comparative Examples to 4

Electrolytic nickel foils were prepared in the same manner as in Example 1, except that conditions of an electrolyte and electrolysis as shown in the following Table 2 were applied.

TABLE 2

| Comparative Examples | Temperature (° C.) | Current density (A/dm$^2$) | Nickel precursor (type, g/L) | pH buffer (type, g/L) | Plating time (s) | pH | (C1) (g/L) | (C2) (g/L) |
|---|---|---|---|---|---|---|---|---|
| 1 | 55 | 20 | (A1), 300 | (B1), 45 (B2), 50 | 400 | 3 | 0 | 0 |
| 2 | | | (A1), 300 | (B2), 50 | | | 0 | 0 |
| 3 | | | (A2), 450 | (B2), 35 | | | 2 | 0 |
| 4 | | | (A1), 300 | (B1), 45 | | | 3 | 5 |

A1: nickel sulfate A2: nickel sulfamate B1: boric acid B2: sodium citrate C1: saccharin C2: sodium allyl sulfonate Evaluation of Material Properties
Roughness Measurement The roughness distribution throughout one surface of the sample was measured in accordance with the ISO 25178 standard using a roughness meter (Model name: NV-2700 commercially available from Nano System), and Rz, Rt, and Ra in longitudinal and lateral directions based on the center point of the sample were measured.

Glossiness Measurement

60° specular gloss at an incidence angle of 60° was measured in accordance with the JIS Z 8741 standard using a glossmeter (IG-410 Ultra High Gloss Meter commercially available from Horiba). The unit of glossiness measured was gloss units (GU).

The roughness and glossiness according to Examples and Comparative Examples measured by the above methods are summarized in the following Table 3.

TABLE 3

| Samples | Roughness (μm) | | | Glossiness (Gs 60) |
|---|---|---|---|---|
| | Ra | Rz | Rt | |
| Example 1 | 0.05 | 0.19 | 0.37 | 445 |
| Example 2 | 0.04 | 0.16 | 0.26 | 473 |
| Example 3 | 0.03 | 0.17 | 0.28 | 502 |
| Example 4 | 0.03 | 0.15 | 0.22 | 511 |
| Example 5 | 0.02 | 0.09 | 0.18 | 580 |
| Example 6 | 0.03 | 0.12 | 0.19 | 542 |
| Example 7 | 0.03 | 0.14 | 0.37 | 463 |
| Example 8 | 0.03 | 0.15 | 0.45 | 475 |
| Example 9 | 0.04 | 0.27 | 0.34 | 399 |
| Example 10 | 0.03 | 0.29 | 0.48 | 279 |
| Comparative Example 1 | 0.38 | 1.91 | 3.66 | 4.7 |
| Comparative Example 2 | 0.35 | 2.01 | 3.87 | 4.1 |
| Comparative Example 3 | 0.38 | 1.8 | 3.4 | 50 |
| Comparative Example 4 | 0.04 | 0.17 | 2.4 | 554 |

As shown in Table 3, in the case of Examples 1 to 10, it can be confirmed that all surface roughness parameters Ra, Rz, and Rt were very low, and glossiness (Gs 60) was high as compared to Comparative Examples 1 to 4.

SEM Image Evaluation

Figure 1A:
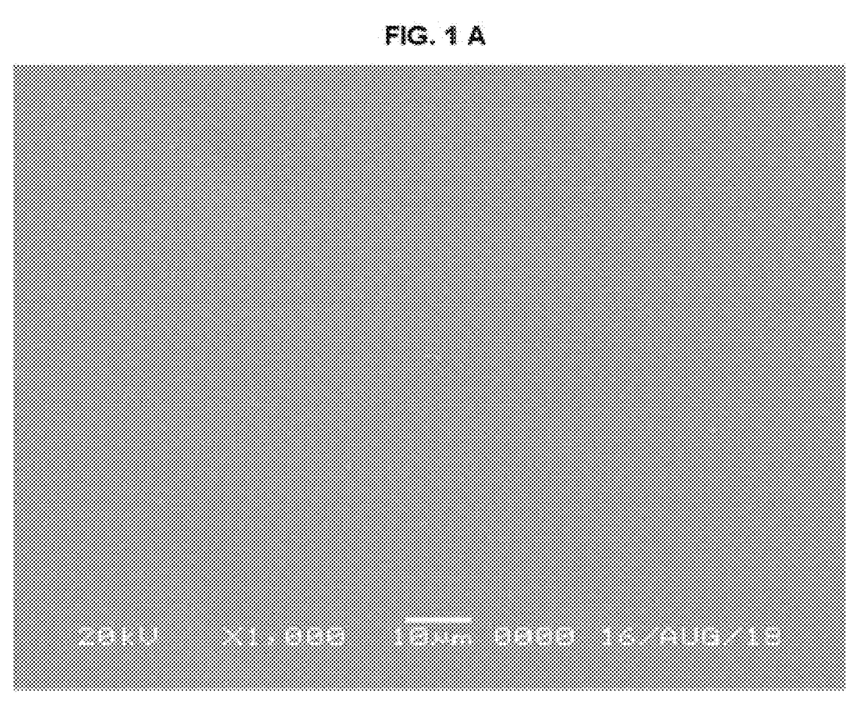
FIG. 1A shows a 1,000× scanning electron microscope (SEM) image of an electrolytic nickel foil of Example 1.
Figure 1B:
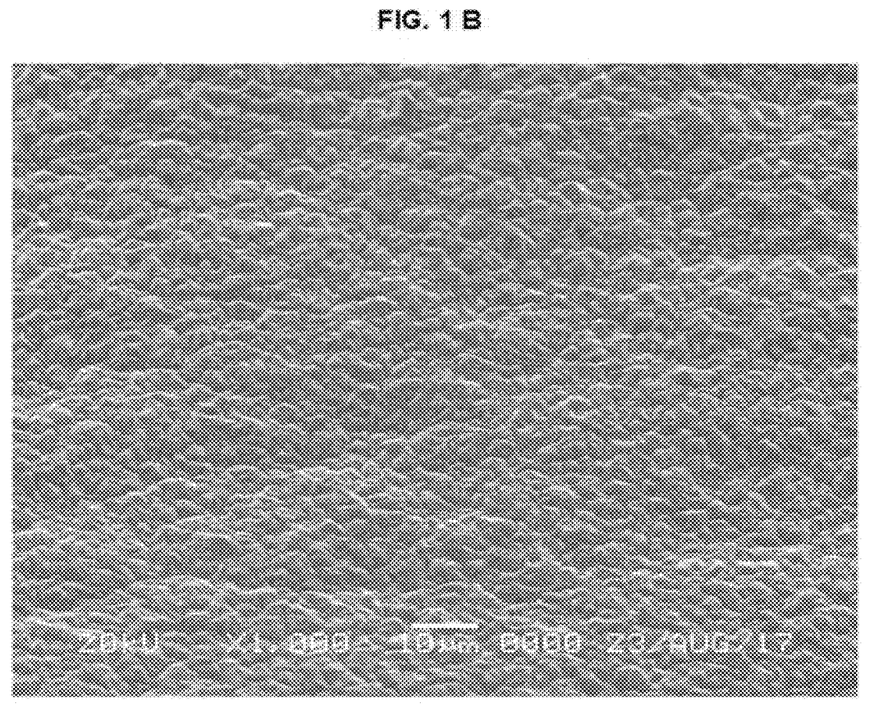
FIG. 1B shows a 1,000×SEM image of an electrolytic nickel foil of Comparative Example 1.

SEM images were obtained by photographing the flat surfaces of the electrolytic nickel foils of Example 1 and Comparative Example 1 at 1,000× magnification, and results thereof are as shown in FIG. 1A and FIG. 1B. When FIG. 1A and FIG. 1B are compared, it can be confirmed that Example 1 exhibited not only a lower surface protrusion height and uniform height distribution as compared to Comparative Example 1.

3D Profiling

The flat surfaces of the electrolytic nickel foils of Example 1 and Comparative Example 1 were subjected to 3D profiling through white-light scanning interferometry to obtain profiling results shown in FIGS. 2A to 2E for Example 1 and FIGS. 3A to 3E for Comparative Example 1.

Figure 2A:
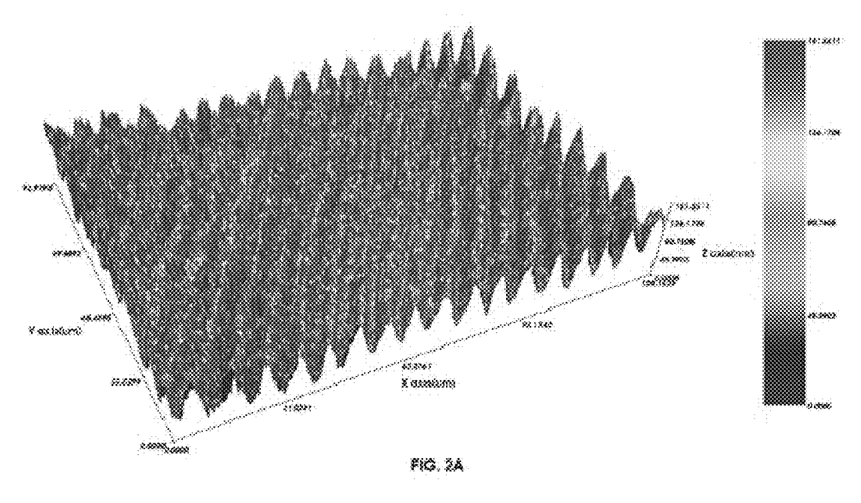
FIG. 2A shows a 3D profiling image of one surface of an electrolytic nickel foil of Example 1 through white-light scanning interferometry.
Figure 2B:
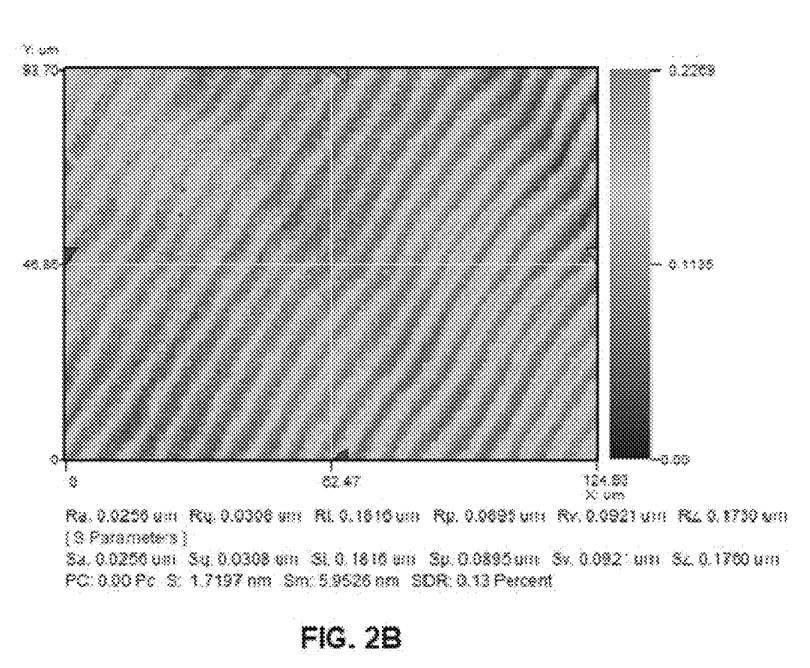
FIG. 2B show an image obtained by measuring one surface of an electrolytic nickel foil of Example 1 through white-light scanning interferometry.
Figure 3A:
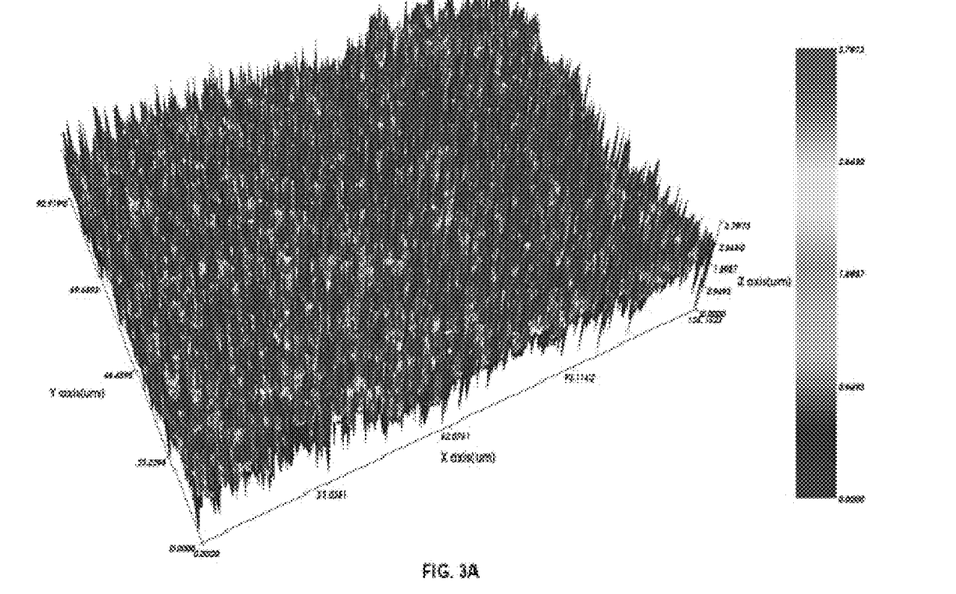
FIG. 3A shows a 3D profiling image of one surface of an electrolytic nickel foil of Comparative Example 1 through white-light scanning interferometry.
Figure 3B:
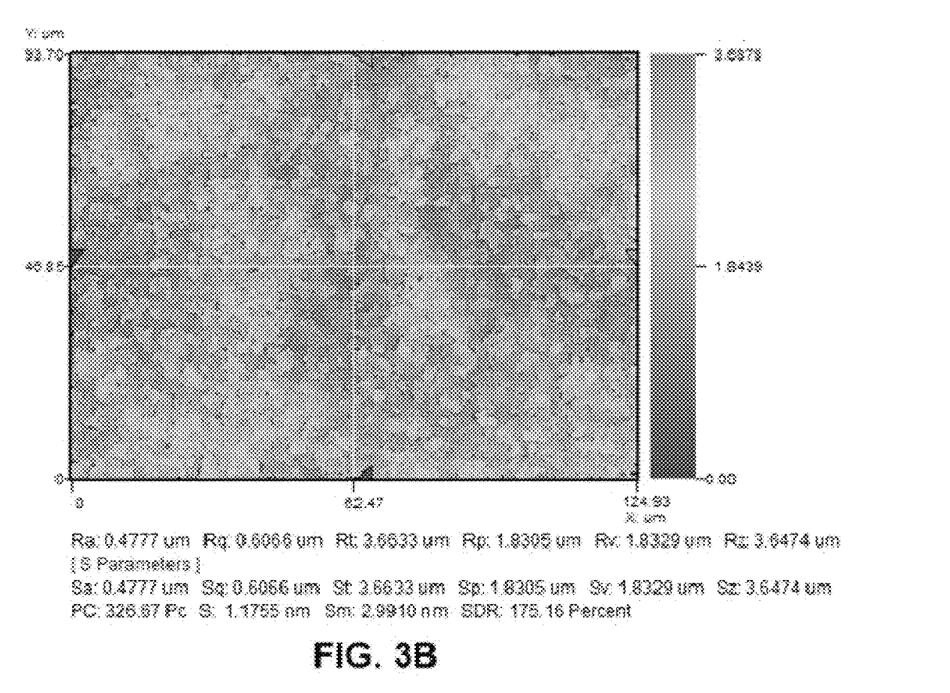
FIG. 3B show an image obtained by three-dimensionally measuring one surface of an electrolytic nickel foil of Comparative Example 1 through white-light scanning interferometry.

When FIG. 2A and FIG. 3A obtained by 3D profiling are compared, it can be confirmed that Example 1 exhibited a surface having regular surface protrusions with lower height as compared to Comparative Example 1. In view of the fact that a discharge, that is, a short circuit, occurs in a protrusion that is significantly higher than its surroundings, it can be easily seen that Example 1 has excellent morphology.

Figure 2C:
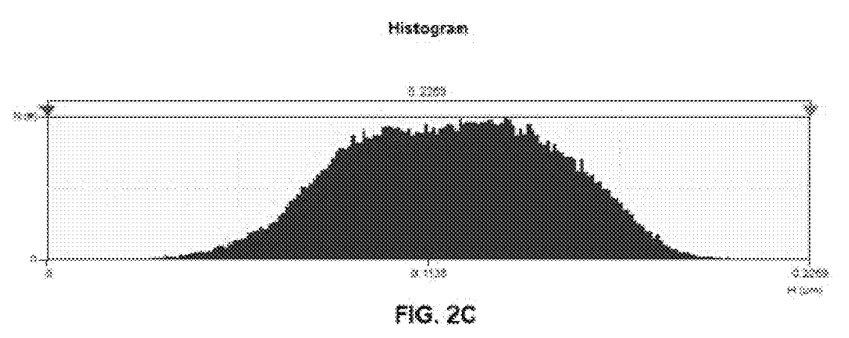
FIG. 2C shows a graph illustrating the roughness distribution of one surface of an electrolytic nickel foil of Example 1.
Figure 3C:
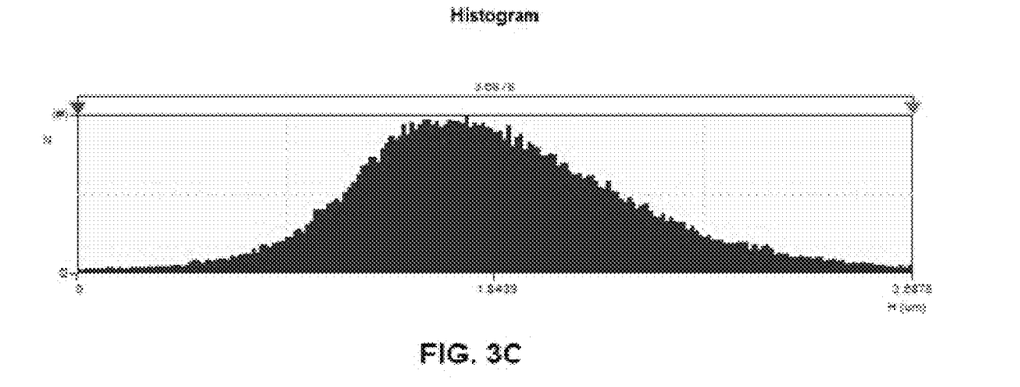
FIG. 3C shows a graph illustrating the roughness distribution of one surface of an electrolytic nickel foil of Comparative Example 1.

FIG. 2C and FIG. 3C show graphs illustrating the roughness distribution of the surfaces of the electrolytic nickel foils of Example 1 and Comparative Example 1, respectively, and FIG. 2C shows a narrow protrusion height (Rz) distribution and a low maximum protrusion height (Rt), which indicates the surface of Example 1 is uniform.

Figure 2D:
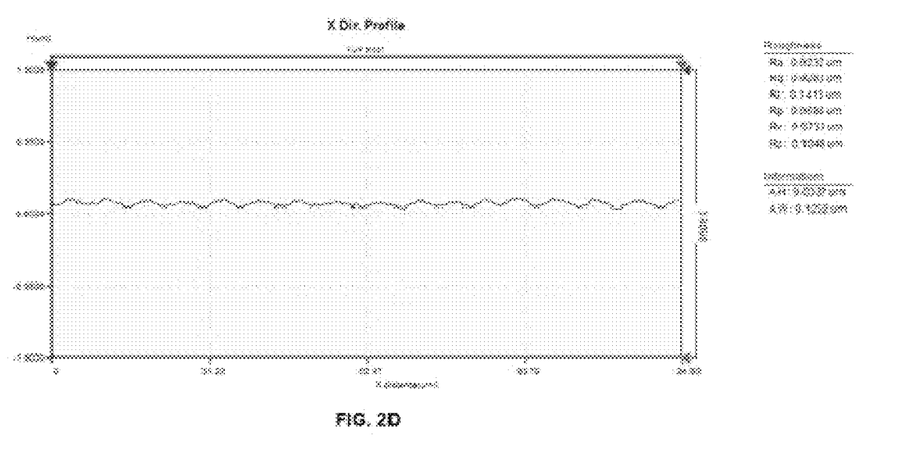
FIG. 2D shows a graph illustrating the lateral roughness distribution of an electrolytic nickel foil of Example 1.
Figure 3D:
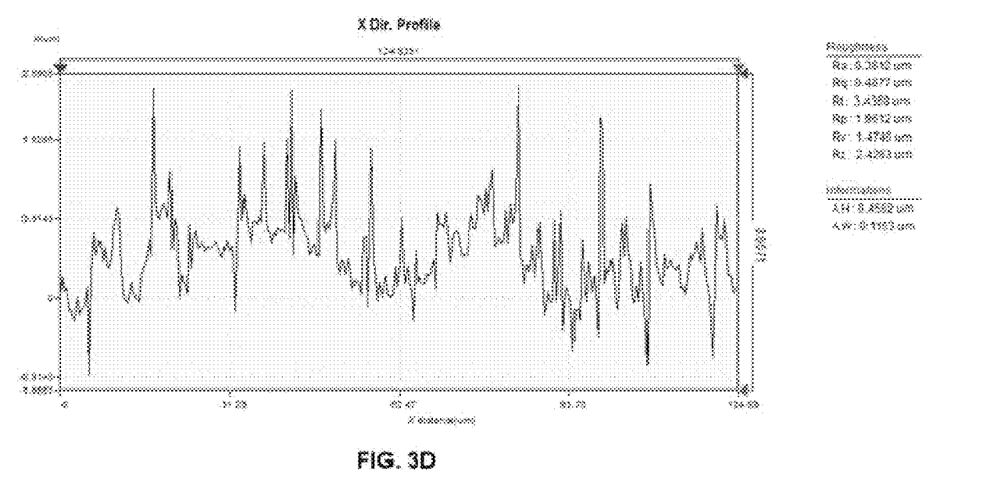
FIG. 3D shows a graph illustrating the lateral roughness distribution of an electrolytic nickel foil of Comparative Example 1.

FIG. 2D and FIG. 3D show graphs illustrating the lateral roughness distribution of the electrolytic nickel foils of Example 1 and Comparative Example 1, respectively, and FIG. 2D for Example 1 shows superior flatness and high smoothness as compared to FIG. 3D for Comparative Example 1.

Figure 2E:
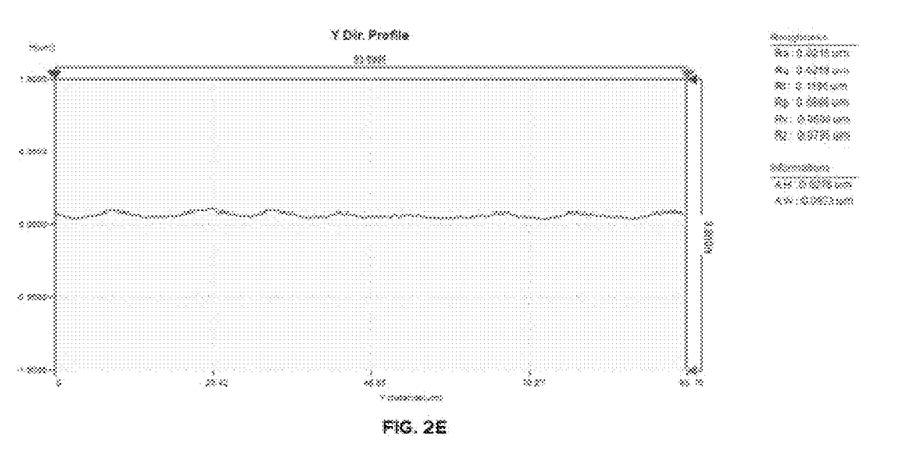
FIG. 2E shows a graph illustrating the longitudinal roughness distribution of an electrolytic nickel foil of Example 1.
Figure 3E:
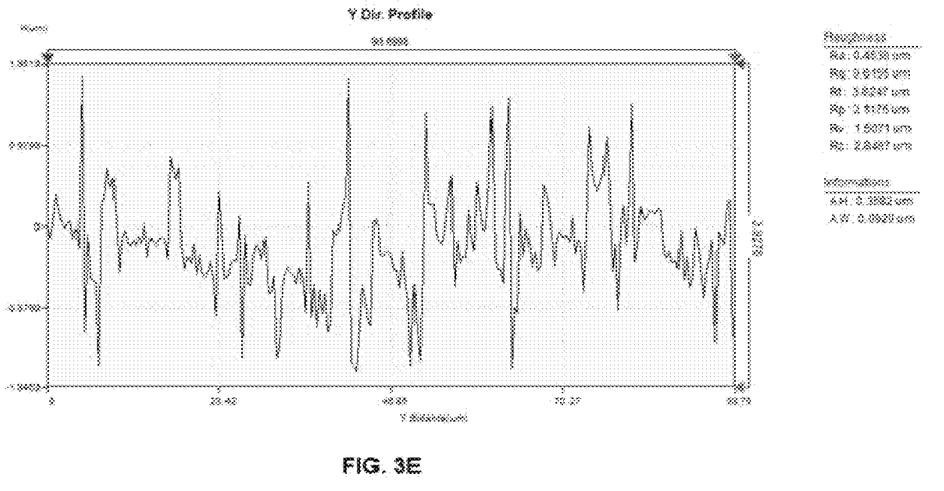
FIG. 3E shows a graph illustrating the longitudinal roughness distribution of an electrolytic nickel foil of Comparative Example 1.

FIG. 2E and FIG. 3E show graphs illustrating the longitudinal roughness distribution of the electrolytic nickel foils of Example 1 and Comparative Example 1, respectively, and FIG. 2E for Example 1 shows superior flatness and high smoothness as compared to FIG. 3E for Comparative Example 1.

Capacitor Manufacture

Example 11

The electrolytic nickel foil of Example 1 was placed on a deposition plate of a sputtering chamber, and an atmospheric pressure of about 3 torr was maintained under a chamber atmosphere composed of 95% argon and 5% oxygen. The deposition plate was heated to about 650° C., and barium titanate was formed on the electrolytic nickel foil by sputtering at a RF power of about 150 W using a barium titanate ($BaTiO_3$) target having a diameter of about 3 inches. Deposition was performed for about 150 minutes to form an approximate 0.7 μm-thick dielectric.

The barium titanate-coated electrolytic nickel foil was fired in a chamber set at about 900° C. at an oxygen partial pressure of about $2\times10^{-7}$ atm for about 2 hours and then cooled. An approximate 0.2-μm copper electrode was deposited on the surface of the barium titanate-coated electrolytic nickel foil by a sputtering method to manufacture a capacitor.

Comparative Example 5

A capacitor was manufactured using the electrolytic nickel foil of Comparative Example 1 in the same manner as in Example 11.

Capacitor Short Experiment

Whether a short circuit occurred or not in the finished capacitor sample by applying a bias of about −10 to 10 V at room temperature (25° C.), about 1 khz, and an oscillating voltage of about 50 mV using a digital LCR meter was confirmed. As a result, a short circuit did not occur in the capacitor manufactured using the electrolytic nickel foil of Example 1, whereas a short circuit occurred in the capacitor manufactured using the electrolytic nickel foil of Comparative Example 1.

The invention claimed is:

1. A method of preparing an electrolytic nickel foil for a thin film capacitor, on at least one surface thereof, a flat surface having an arithmetic average roughness (Ra) of 0.05 µm or less, a ten-point average roughness (Rz) of 0.20 µm or less, a maximum protrusion height (Rt) of 0.50 µm or less, and a 60° specular gloss of 200 GU or more,
wherein the method comprises performing electrolytic plating with an electrolyte including 400 to 600 g/L of a nickel ion precursor, 10 to 30 g/L of a pH buffer, and 0.5 to 2.0 g/L of a roughness controlling agent and having a pH of 1 to 5, and
wherein the roughness controlling agent comprises saccharin and sodium allyl sulfonate, and the concentration ratio of saccharin and sodium allyl sulfonate is 1:0.05 to 1:20.

2. The method of claim 1, wherein the nickel ion precursor is one or more selected from the group consisting of nickel sulfate, nickel sulfamate, nickel chloride, and nickel nitrate.

3. The method of claim 1, wherein the electrolytic plating is performed by applying current at a current density of 10 to 100 A/dm2 at 40° C. to 60° C.

4. A method of preparing an electrolytic nickel foil for a thin film capacitor, on at least one surface thereof, a flat surface having an arithmetic average roughness (Ra) of 0.05 µm or less, a ten-point average roughness (Rz) of 0.20 µm or less, a maximum protrusion height (Rt) of 0.50 µm or less, and a 60° specular gloss of 200 GU or more,
wherein the method comprises performing electrolytic plating with an electrolyte including 400 to 600 g/L of a nickel ion precursor, 10 to 30 g/L of a pH buffer, and 0.5 to 2.0 g/L of a roughness controlling agent and having a pH of 1 to 5, and
wherein the roughness controlling agent comprises 0.1 to 1 g/L of saccharin and 0.4 to 0.8 g/L of sodium allyl sulfonate, and wherein the roughness controlling agent is less than 0.04 wt % of the electrolyte.

5. The method of claim 4, wherein the nickel ion precursor is one or more selected from the group consisting of nickel sulfate, nickel sulfamate, nickel chloride, and nickel nitrate.

6. The method of claim 4, wherein the electrolytic plating is performed by applying current at a current density of 10 to 100 A/dm2 at 40° C. to 60° C.

* * * * *